(12) United States Patent
Roy

(10) Patent No.: US 9,856,767 B2
(45) Date of Patent: Jan. 2, 2018

(54) SYSTEMS AND METHODS FOR REDUCING EMISSIONS IN EXHAUST OF VEHICLES AND PRODUCING ELECTRICITY

(71) Applicant: Tecogen, Inc., Waltham, MA (US)

(72) Inventor: Jean Roy, Waltham, MA (US)

(73) Assignee: Tecogen, Inc., Waltham, MA (US)

( * ) Notice: Subject to any disclaimer, the term of this patent is extended or adjusted under 35 U.S.C. 154(b) by 153 days.

(21) Appl. No.: 14/947,276

(22) Filed: Nov. 20, 2015

(65) Prior Publication Data

US 2016/0076419 A1 Mar. 17, 2016

Related U.S. Application Data

(63) Continuation-in-part of application No. 13/616,752, filed on Sep. 14, 2012, now Pat. No. 9,631,534, which is a continuation-in-part of application No. 12/816,706, filed on Jun. 16, 2010, now Pat. No. 8,578,704.

(Continued)

(51) Int. Cl.
| | | |
|---|---|---|
| *F01N 5/02* | (2006.01) | |
| *F01N 3/02* | (2006.01) | |
| *F01N 3/10* | (2006.01) | |
| *F01N 3/30* | (2006.01) | |
| *F01N 9/00* | (2006.01) | |
| *F01N 13/00* | (2010.01) | |
| *B01D 53/94* | (2006.01) | |
| *F01N 3/04* | (2006.01) | |
| *F01N 3/05* | (2006.01) | |

(Continued)

(52) U.S. Cl.
CPC ....... *F01N 3/0205* (2013.01); *B01D 53/9454* (2013.01); *B01D 53/9477* (2013.01); *F01N 3/04* (2013.01); *F01N 3/05* (2013.01); *F01N 3/101* (2013.01); *F01N 3/2046* (2013.01); *F01N 3/2889* (2013.01); *F01N 3/30* (2013.01); *F01N 5/025* (2013.01); *F01N 9/00* (2013.01); *F01N 13/009* (2014.06); *F01N 13/0097* (2014.06); *B01D 2258/014* (2013.01); *F01N 2240/36* (2013.01); *Y02T 10/16* (2013.01); *Y02T 10/22* (2013.01); *Y02T 10/26* (2013.01)

(58) Field of Classification Search
CPC .......... F01N 1/14; F01N 3/0205; F01N 3/022; F01N 3/05; F01N 3/101; F01N 3/2046; F01N 3/2889; F01N 3/30; F01N 5/025; F01N 2260/022; F01N 2270/02

See application file for complete search history.

(56) References Cited

U.S. PATENT DOCUMENTS

| | | | | |
|---|---|---|---|---|
| 5,603,215 A | * | 2/1997 | Sung ................ | B01D 53/944 60/274 |
| 2004/0206069 A1 | * | 10/2004 | Tumati ............... | F01N 3/025 60/285 |

(Continued)

*Primary Examiner* — Jonathan Matthias
(74) *Attorney, Agent, or Firm* — Intrinsic Law Corp.

(57) ABSTRACT

Methods and apparatus for removing undesired pollutants from exhausts streams of spark-ignited internal-combustion engines in vehicles while producing electrical energy as a byproduct. The apparatus includes a reduction catalyst, a thermoelectric generator (TEG), and an oxidation catalyst. The TEG cools the exhaust stream and generates electricity. The exhaust stream is oxygenated after passing through the TEG and prior to passing through the oxidation catalyst.

24 Claims, 14 Drawing Sheets

Related U.S. Application Data

(60) Provisional application No. 61/343,392, filed on Apr. 28, 2010.

(51) Int. Cl.
  *F01N 3/20* (2006.01)
  *F01N 3/28* (2006.01)

(56) References Cited

U.S. PATENT DOCUMENTS

2011/0240080 A1* 10/2011 Prior .................. F01N 5/025
                                                                                  136/201
2011/0311421 A1* 12/2011 Backhaus-Ricoult B01D 53/9477
                                                                                  423/213.2

* cited by examiner

SYSTEMS AND METHODS FOR REDUCING EMISSIONS IN EXHAUST OF VEHICLES AND PRODUCING ELECTRICITY

RELATED APPLICATIONS

This application is a continuation-in-part of U.S. patent application Ser. No. 13/616,752, filed on Sep. 14, 2012, entitled "Assembly and Method for Reducing Nitrogen Oxides, Carbon Monoxide, Hydrocarbons and Hydrogen Gas in Exhausts of Internal Combustion Engines and Producing an Electrical Output," which is a continuation-in-part of U.S. patent application Ser. No. 12/816,706, filed on Jun. 16, 2010, now U.S. Pat. No. 8,578,704, entitled "Assembly and Method for Reducing Nitrogen Oxides, Carbon Monoxide and Hydrocarbons in Exhausts of Internal Combustion Engines," which claims priority to U.S. Provisional Application No. 61/343,392, entitled "Apparatus and Method for Improving Engine Exhaust Aftertreatment in Spark-ignited Geaseous-fueled [sic] Engines," filed on Apr. 28, 2010, each of which is incorporated herein by reference.

TECHNICAL FIELD

This invention relates to treatment of exhausts of internal combustion engines, and more particularly to reduction of nitrogen oxides, carbon monoxide, organic compounds, hydrocarbons, and/or hydrogen gas prevalent in the exhausts of internal combustion engines, particularly spark-ignited, internal combustion engines, and to utilization of the exhaust of internal combustion engines for the production of electrical energy.

BACKGROUND

Spark ignited (SI) internal combustion (IC) engines produce small amounts of undesirable chemical compounds in the combustion chamber, compounds which are exhausted from the engine at high temperatures (800°-1250° F.). For fuels composed primarily of methane and other light hydrocarbons, the commonly regulated chemicals are nitrogen oxides (NO, $NO_2$, or generally $NO_x$) and carbon monoxide (CO). Nitrogen oxides are formed when nitrogen ($N_2$), a major component of air, reacts with oxygen ($O_2$), another component of air, and both are exposed to high temperatures and pressures in an engine combustion chamber. Carbon monoxide, on the other hand, is the consequence of failure of the fuel to completely react with oxygen, resulting in the formation of carbon dioxide ($CO_2$). CO and $NO_x$ are problematic pollutants inasmuch as their regulated values are in many geographical regions set at or below the limits of current technology.

In strictly regulated regions, current practice to control the emission from SI/IC engines fueled by methane-rich fuels (natural gas, bio-fuels, landfill gas, etc.), is to install systems in the engine exhaust ducting to eliminate, to the extent required by regulations, such chemicals. For smaller engines (less than 1000 bhp), the common aftertreatment system is a single stage catalyst. In small systems, the products of combustion exiting the engine are forced through a catalyst monolith (honeycomb structure with precious metal coating) which facilitates the desirable oxidation and reduction reactions:

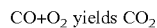

The nitrogen oxides are reduced to gaseous nitrogen ($N_2$) and oxygen ($O_2$), both benign, while the carbon monoxide (CO) is completely oxidized, forming carbon dioxide ($CO_2$), likewise non-harmful and unregulated.

Current catalyst-based emissions systems rely on very accurate control of the engine's operating parameters to maximize the conversion efficiency of the reactions noted above. Specifically, the simultaneous elimination of $NO_x$ and CO through such reactions in a catalytic converter requires a precise operating window of the engine combustion process relative to the mixture of air and fuel. This is depicted in FIG. 1 for a typical SI/IC engine. As shown, rich mixtures result in low $NO_x$ out of the catalyst, but high CO, while lean mixtures result in low CO, but high $NO_x$. From FIG. 1, it is evident that simultaneous cleanup of $NO_x$ and CO requires that the engine air/fuel ratio (AFR) be precisely controlled in the narrow region around the stoichiometric air/fuel ratio (i.e., the theoretical air-fuel ratio required for complete combustion of fuel without any unreacted oxygen). Compliance of both regulated pollutants can only be maintained when the combustion stoichiometry is maintained within points A and B of FIG. 1. The acceptable combustion mixture, to achieve increasingly strict emissions standards, requires that the engine AFR be controlled within narrow limits.

Referring still to FIG. 1, there is depicted typical engine emissions as a function of AFR from a SI/IC engine equipped with a single or multiple three-way catalyst (TWC). Meeting the regulated limits for CO and $NO_x$ require that engine AFR be maintained between points A and B of FIG. 1, a band approximately representing the stoichiometric AFR.

Stationary SI/IC engines operating in most applications in the U.S. and elsewhere are highly regulated relative to allowable CO and $NO_x$ emissions, which are becoming increasingly controlled. Most notably, the California Air Resource Board (CARB) now recommends limits of 0.07 lb/MWh and 0.1 lb/MWh CO as part of their 2007 standard for Combined Heat and Power (CHP) applications. Applying a heat recovery credit for maintaining a minimum 60% overall system efficiency and assuming a 27% electrical efficiency, the emissions limits stated in terms of actual concentration in the exhaust gas are 3.7 PPM $NO_x$ and 8.9 PPM CO. As used herein, "PPM" means parts per million by volume corrected to a standard air dilution factor (15% oxygen equivalent). The area of Southern California under the jurisdiction of the South Coast Air Quality Management District (SCAQMD) has adopted the "CARB 2007" standard for $NO_x$, while restricting CO emissions to a value close to the CARB limit. Other regions in California are likewise adopting similar standards, while other regions of the country (U.S.) are phasing in regulations approaching the CARB 2007 standards (MA, NY and NJ, for example).

Compliance with the newer standards requires extremely high conversion efficiency in the catalyst for both CO and $NO_x$. Extra-large conversion monoliths are needed in addition to extreme precision in controlling the air/fuel mixture.

Similar challenges exist for SI/IC engines in vehicles. The Environmental Protection Agency and CARB have adopted standards that limit the emissions of NOx, CO, and NMOG (Non-methane Organic Gas).

FIG. 2 depicts the steady-state AFR control precision required for a standard engine (Model TecoDrive 7400) utilizing a TWC system sized to conform to CARB 2007. As indicated by a pre-catalyst narrow-band heated exhaust gas oxygen sensor millivolt (mV) output the AFR controller maintains via steady-state (non-dithering) AFR control. As shown in FIG. 2, the engine combustion mixture (air to fuel ratio) is acceptable for catalyst performance to regulated limits only when the signal from a standard lambda sensor in the exhaust duct is maintained between 680 and 694 mV. Above this range, the CO concentration exiting the catalyst exceeds the SCAQMD limit of 8.9 PPM. While below this range the $NO_x$ will rapidly exceed the 3.7 PPM limit. Limits shown in FIG. 2 are those of CARB 2007 with a credit for engine heat recovery, such that 60% of the fuel's heat content is purposefully used as electric power or recovered thermal energy. In order to maintain compliance, combustion air to fuel mixture must be maintained within the 14 mV window for the example shown.

A possible method for expanding the control window for engine operation to attain acceptable emissions from both CO and $NO_x$, is to modify the system such that two stages of catalyst systems are used, each operating in distinctly different chemical atmospheres. Early catalyst systems commonly used a two-stage design with inter-stage air injection. In this era, single purpose catalyst monoliths-oxidation or reduction, but not both, were employed. Later as multi-purpose, single stage catalysts (TWC) were developed, these became the dominant style. The early two-stage systems were employed in stationary gaseous fueled SI/IC engines with success but under far less strict standards. Presumably, the NO reformation problems encountered with the two-stage systems were present in the earlier era, but were inconsequential relative to the regulated limits at that time.

FIG. 3 depicts the above-described arrangement. As shown, two catalyst stages are plumbed into an exhaust system in series. Air is pumped into the exhaust stream between a stage one catalyst (CAT 1) (a reduction catalyst) and a stage 2 catalyst (CAT 2) (an oxidation catalyst) and mixed thoroughly. The engine air-to-fuel ratio is maintained so as to facilitate effective $NO_x$ removal in the first stage. The air injected into the exhaust results in an oxidizing environment at the second catalyst stage biased towards the oxidation of CO to $CO_2$, even if the engine AFR is outside the acceptable operation window on the rich side, a highly significant benefit.

Tests utilizing the two-stage system demonstrated that the two-stage strategy with air injection was not only ineffective, but actually detrimental to catalyst performance. $NO_x$ emissions from the two-stage system were found to be generally higher than a single-stage system of comparable size and catalyst material loading. This surprising result indicated that a mechanism exists such that $NO_x$ is formed in the second stage, made possible by the oxygen rich environment, coupled also with conditions conducive to chemical reaction, i.e., high temperature and an abundance of a catalytic material.

It would be desirable to consistently and reliably removing nitrogen oxides and carbon monoxide, as well as hydrocarbons, hydrogen gas and/or organic compounds, from the exhausts of spark-ignited internal combustion engines.

It would also be desirable to improve the efficiency of spark-ignited internal combustion engines and vehicles containing such engines.

SUMMARY

With the above and other objects in view, a feature of the invention is the provision of assemblies and methods for effectively reducing nitrogen oxides, carbon monoxide, hydrocarbons, organic compounds and/or hydrogen gas in spark-ignited internal combustion engine exhausts, by presenting the gases entering a catalytic converter second stage at a lower temperature.

In accordance with the invention, the gases entering the second catalytic converter stage are cooled immediately following stage one, from the extremely high temperatures normally exiting the engine (800°-1250° F.) to a lower value. An intermediate temperature, or range of temperatures, provide desirable chemical reactions (CO and hydrocarbon removal) and are highly favored over those that are undesirable because of $NO_2$ formation. This is deemed to be a particularly viable approach in combining heat and power (CHP) applications, inasmuch as the gases are cooled in a heat reclaim process. Doing so in a CHP application requires only that (1) the cooling stage be oriented to cool between stages, and (2) the cooling effectiveness be altered to reside in a favorable temperature range. This approach can also be applied to exhaust systems for vehicles.

In accordance with a further feature of the invention, the cooling of the gases entering the second catalytic converter stage is undertaken in whole or in part by a thermoelectric generator (TEG) which functions to generate useful electricity while cooling exhaust gases. The electricity generated by a TEG in a CHP application can be used to power a building, a portion of a building, or an auxiliary system for the building (e.g., an air conditioner). Likewise, the electricity generated by a TEG in a vehicular application can be used to power (or complement the power generated by the alternator) the sound system, the climate control system (e.g., air conditioner and fan), the defroster, power seats, seat warmers, windshield wipers, power windows, and other electrical components in a vehicle. The electricity can also be used to propel the vehicle, for example by powering or partially powering an electric motor.

The above and other features of the invention, including various novel details of construction and combinations of parts and method steps, will now be more particularly described with reference to the accompanying drawings and pointed out in the claims. It will be understood that the particular assemblies and methods embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent. In the drawings.

DETAILED DESCRIPTION

Figure 4:
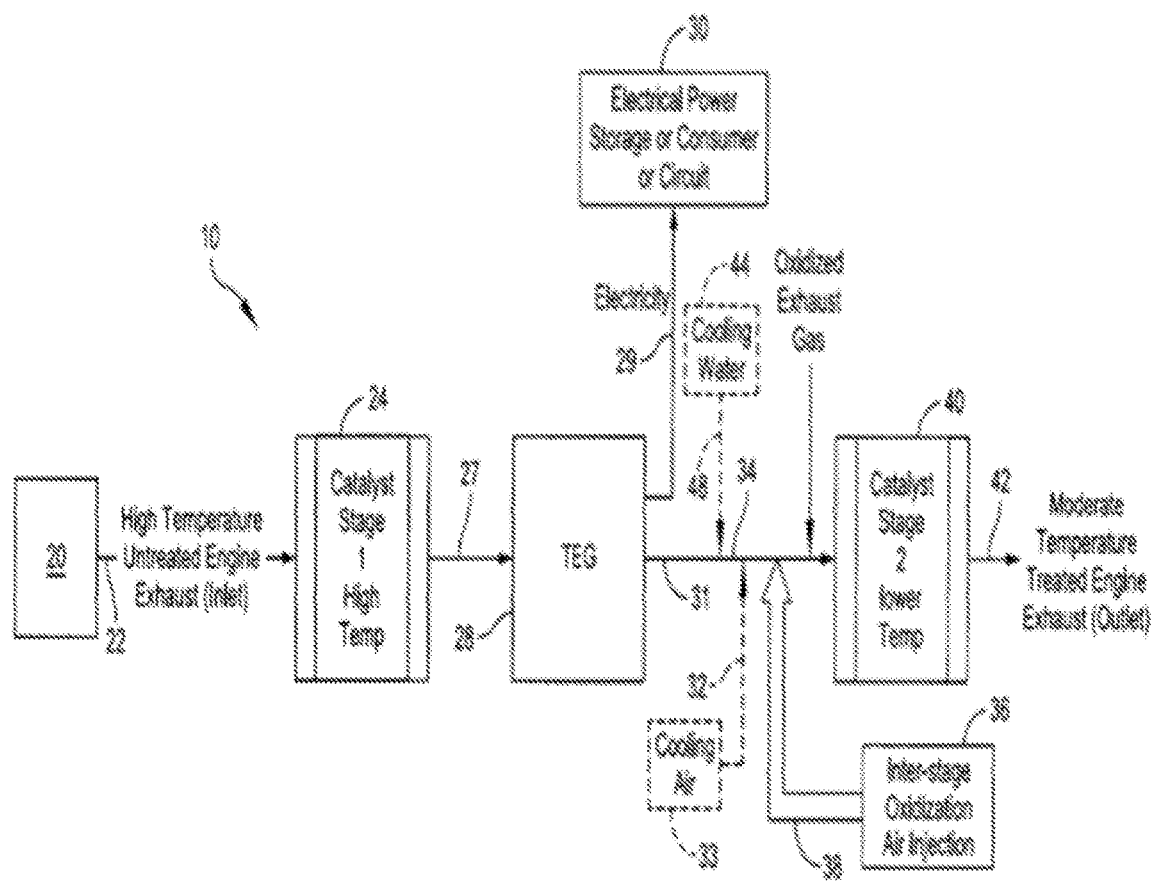
FIG. 4 is a diagrammatic depiction of an assembly and method for reducing nitrogen oxides, carbon monoxide, hydrocarbons and/or hydrogen gas in the exhaust of an internal combustion engine, and for simultaneously generating electrical energy.

Referring to FIG. 4, there is illustrated a two-stage system 10 with inter-stage cooling and electrical power generation. As shown in FIG. 4, the engine exhaust gases exit an engine 20 and are channeled by an exhaust gas conduit 22 to a catalytic converter first stage 24. The engine 20 can be a spark-ignited internal combustion engine (SI/IC), as discussed above. The engine 20 can be a stationary engine, for example in a CHP system, or a vehicular engine, for example in a car or truck.

The catalytic converter first stage 24 has one, two, or more catalytic elements. In some embodiments, the catalytic converter first stage 24 can be a three-way catalyst (TWC), which can include platinum (Pt) and/or palladium (Pd). In some embodiments, two catalytic elements can achieve high performance in the first stage 24 relative to $NO_x$ removal. In general, the catalytic converter first stage 24 includes a reduction catalyst to reduce $NO_x$ compounds in the exhaust stream flowing through exhaust gas conduit 22.

The combustion gases from the engine 20 enter the catalytic converter first stage 24 at a normal engine exhaust temperature (about 800-1250° F.), after which the exhaust flow stream 27 is cooled as it passes through a thermoelectric generator (TEG) 28 to reduce the stream temperature and generate electrical power which is transmitted by a conductive power line 29 to an electrical power storage (e.g., battery) or consuming reservoir or circuit 30.

The exhaust stream 31 leaving the TEG 28 may optionally be further cooled by a water injector 44 and/or by being injected with a controlled quantity of air from a cooling air injector 33. The stream 31 is then subjected to oxidation air injection by an inter-stage oxidation air injector 36 and piped into a catalytic stage converter second stage 40, and thence to an outlet 42. In some embodiments, the cooling air injector 33 and the inter-stage oxidation air injector 36 are combined into a single air injector. There is provided by the present invention the system 10, shown in FIG. 4, for reducing nitrogen oxides, carbon monoxide, hydrocarbons, organic compounds, and/or hydrogen gas in internal combustion engine exhausts and for simultaneously generating electrical power. The assembly 10 comprises the exhaust conduit 22 having an exhaust receiving end for connecting to and extending from the internal combustion engine 20, the first stage catalytic converter 24 in communication with the exhaust gas conduit 22, optional cooling air injector 33, optional water injector 44, the thermoelectric generator (TEG) 28 adapted to receive engine exhausts from the exhaust flow stream conduit 27, and the second stage catalytic converter 40.

The exhaust flow stream conduit 27 facilitates movement of the engine exhausts from the first stage catalytic converter 24, to the TEG 28, using the hot exhausts for conversion to useful electrical energy and, in doing so, permitting cooling of the exhausts. A cooling air injection conduit 32 may optionally be provided, which receives air from the cooling air injector 33 and is in communication with a cooled exhaust conduit 34 exiting the TEG 28. An inter-stage oxidation air injector 36 and conduit 38 are in communication with the cooled exhaust conduit 34, and the second stage catalytic converter 40 is in communication with the cooled and oxidized exhaust gas conduit 34, the second stage catalytic converter 40 having an exhaust emitting outlet 42.

If additional cooling of the exhausts in the cooled exhaust conduit 34 is desired, a cooling water source 44 may be placed in communication with the cooled exhaust conduit 34 by means of a cooling water conduit 48.

In operation of the assembly of FIG. 4, the engine 20 generates exhaust gases while burning fuel at a stoichiometric or near stoichiometric AFR (e.g., plus or minus 10% of the stoichiometric AFR). The exhaust gases can have an oxygen concentration by volume (e.g., a first oxygen content) of close to zero, e.g., less than about 0.25%, less than about 0.10%, less than about 0.05%, or less than about 0.01%. The exhaust gases from the engine 20 pass through the exhaust gas conduit 22 and into and through the firststage catalytic converter 24, and pass on to the exhaust flow stream conduit 27. As used herein, the term "about" means plus or minus 10% of the relevant value.

The exhaust gases from the first stage catalytic converter 24 are fed through the conduit 27 into the TEG 28 wherein heat is converted to electrical energy, which is fed by the power line 29 to an electrical storage unit, circuit, or electrically powered device 30.

The cooled exhaust gas of the TEG exhaust stream 31, and injected cooling air 32, if desired, and injected oxidation air from air conduit 38, proceed past the air injection conduit 38 and proceed to the second catalytic converter stage 40 and exit therefrom at the outlet 42. The oxygen concentration of the exhaust stream 31 before it enters the second stage catalytic converter can have any oxygen concentration (e.g., a second oxygen content) of between about 0.25% and about 1.0%, including 0.50%, 0.75%, and any value therebetween. Thus, the injected air from air conduit 38 can increase the oxygen content of the TEG exhaust stream from a first oxygen content of less than or equal to 0.10% to a second oxygen content of greater than or equal to 0.25%.

The exhaust gas from the TEG 28 may be further cooled by cooling water injection from the cooling water conduit 48. The exhaust gas entering the second catalytic converter stage 40 can be at a temperature of about 300-550° F. including any temperature or sub-range within that range, such as about 300-500° F., about 400-500° F., about 300-325° F., about 325-350° F., about 350-375° F., about 375-

400° F., about 400-425° F., about 425-450° F., about 475-500° F., about 500-525° F., and/or about 525-550° F. In some embodiments, the temperature can be about 390-420° F. and/or about 415-420° F.

Figure 5:
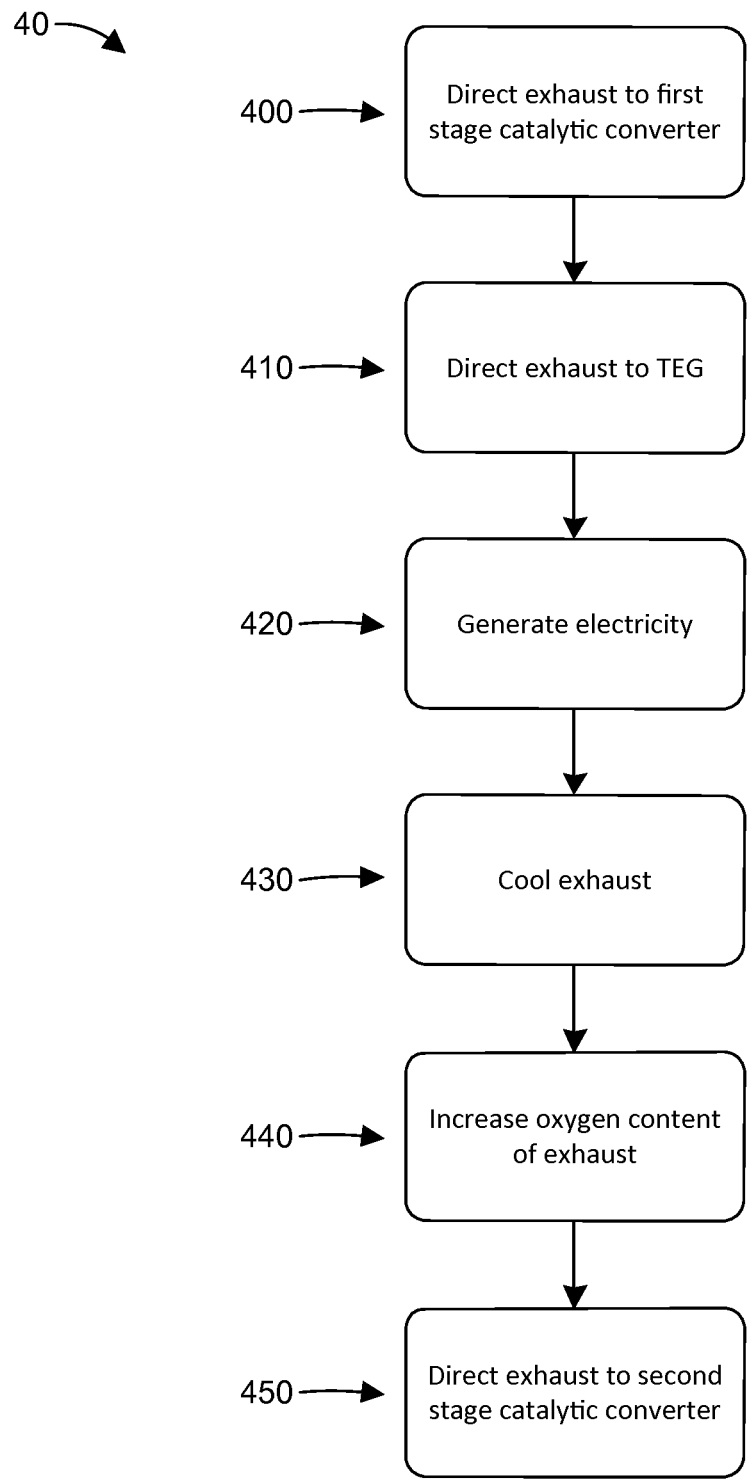
FIG. 5 is a flowchart for a method for reducing nitrogen oxides, carbon monoxide, hydrocarbons, organic compounds, and/or hydrogen gas from exhausts of internal combustion engines and for generating electrical energy.

There is further provided in conjunction with the assembly 10, shown in FIG. 4, a method for reducing nitrogen oxides, carbon monoxide, hydrocarbons, organic compounds, and/or hydrogen gas from exhausts of internal combustion engines and for generating electrical energy as illustrated in the flowchart 50 in FIG. 5. The method comprises the steps of directing the engine exhaust, which was generated at a stoichiometric or near stoichiometric AFR, to the first stage catalytic converter 24 (step 400), removing the exhausts from the first stage catalytic converter, through the exhaust gas outlet conduit 27, and directing the exhaust from the conduit 27 to the TEG 28 (step 410), adapted to convert the exhaust's high temperature into electrical energy (step 420) which is removed from the system by the power line 29 and directed to the electrical storage device and/or the electrically driven device 30. In step 430, the exhaust is cooled by the TEG 28 either alone or in combination with cooling air injector 32 and/or cooling water source 44, to about 300-550° F., or any temperature or sub-range therebetween, as discussed above. Thereafter, in step 440, the oxygen concentration of the exhaust gas 34 leaving the TEG 28 is increased, for example through injection with oxidation air by the oxidation air injector 36 by way of the air injection conduit 38. The oxygen concentration by volume of the exhaust gas leaving the TEG 28 can be increased to between about 0.25% and about 1.0%, including 0.50%, 0.75%, and any value therebetween.

The method further compromises, in step 450, directing the exhaust in the exhaust gas conduit 34 to the second stage catalytic converter 40, and discharging exhaust from the outlet 42 of the second stage catalytic converter 40, whereby to provide engine exhausts of less nitrogen oxides, less carbon monoxide, less hydrocarbons, less organic compounds, and/or less hydrogen gas, and simultaneously generating useful electrical power.

Figure 6:
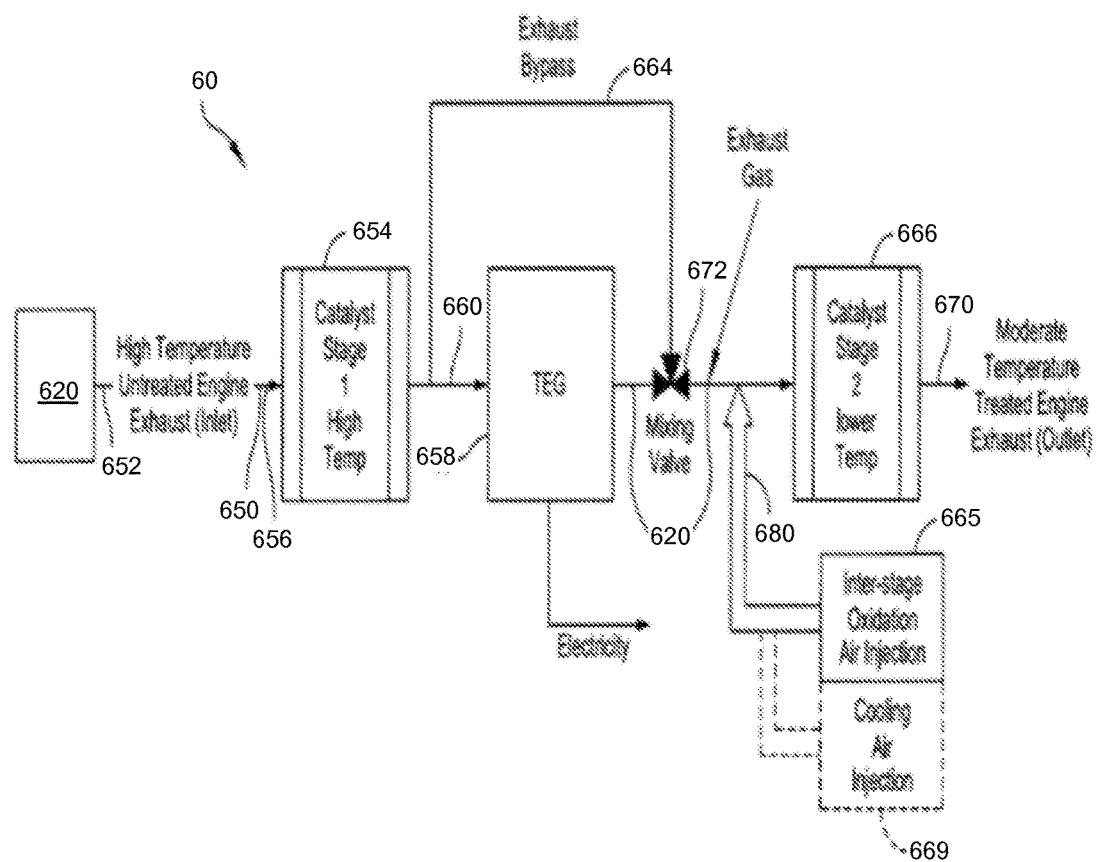
FIG. 6 is a diagrammatic depiction of an alternative assembly and method for reducing nitrogen oxides, carbon monoxide, organic compounds, and/or hydrogen gas in the exhaust of an internal combustion engine and for providing an output of electrical energy.

There is further provided an alternative embodiment 60 of the assembly for reducing nitrogen oxides, carbon monoxide, hydrocarbons, organic compounds, and/or hydrogen gas in internal combustion engine exhausts, the alternative assembly 60 being shown in FIG. 6 and comprising a first exhaust conduit 650 having an exhaust receiving end 652 connected to and extending from the internal combustion engine 620. The engine 620 can be a SI/IC engine (e.g., a stationary engine in a CHP system or a vehicular engine) that operates at a stoichiometric or near stoichiometric AFR, as discussed above. As a result of the stoichiometric or near stoichiometric AFR, the exhaust gases leaving the engine 620 can have an oxygen concentration of close to zero by volume, e.g., less than about 0.25%, less than about 0.10%, less than about 0.05%, or less than about 0.01%

A first stage catalytic converter 654 (e.g., a reduction catalyst such as a TWC) is in communication with a dispensing end 656 of the first exhaust conduit 650. The first stage catalytic converter 654 includes a reduction catalyst to reduce NOx compounds in the exhaust stream flowing through the first exhaust conduit 650. In some embodiments, the first stage catalytic converter 654 includes a TWC. A TEG 658 is in communication with the first stage catalytic converter 654 for receiving and utilizing exhaust heat for conversion to electrical power, as discussed above. A first portion of engine exhausts received from the first stage catalytic converter 654 enters the TEG 658 by way of a conduit 660. A conduit 620 for TEG exhausts extends from the TEG 658.

The assembly 60 further includes a TEG by-pass conduit 664 in communication with the output conduit 660 of the first stage catalytic converter 654, and the conduit 620 for TEG exhaust. The TEG by-pass conduit 664 joins the TEG exhaust conduit 620 at a mixing valve 672. The joined exhausts from conduits 620 and 664, and from the mixing valve 672, are injected with air from an oxidation air injection conduit 680 extending from an air injection unit 665. The injection oxidation air through conduit 680 can increase the oxygen concentration by volume of the exhaust to between about 0.25% to about 1.0%, including 0.50%, 0.75%, and any value therebetween.

A second stage catalytic converter 666 (e.g., an oxidation catalyst such as a TWC) is in communication with the TEG exhaust conduit 620 the TEG by-pass conduit 664, and the oxidation air injection conduit 680. The second stage catalytic converter 666 includes an oxidation catalyst, which in some embodiments can be a TWC. An exhaust outlet 670 extends from the second stage catalytic converter 666.

If additional air injection is deemed advantageous, a cooling air injector 669 may be provided in conjunction with the oxidation air injection unit or as an independent air injector. The cooling air injection 669 and/or a cooling water source (not illustrated) can optionally cool the exhaust stream via the conduit 680.

In operation of the assembly of FIG. 6, exhaust gases from the engine 620 flow to the first stage catalytic converter 654. The exhaust leaving the engine 620 and entering the first stage catalytic converter 654 can be at a temperature of 800°-1250° F. and can have an oxygen concentration by volume of close to zero, e.g., less than about 0.25%, less than about 0.10%, less than about 0.05%, or less than about 0.01%. The exhaust exiting the first stage catalytic converter 654 through conduit 660 is directed to either the TEG 658 or the bypass conduit 664. A first portion of the exhaust leaving the first catalytic converter 654 is directed to the TEG 658 through the conduit 660. The TEG 658 converts heat from the exhaust stream to electricity, as discussed above, which can be used to power a building, a vehicle, or other device. As a result of converting heat to electricity, the TEG 658 causes the exhaust to have a lower temperature at the exit conduit 620 than at the entrance conduit 660. A second portion of the exhaust gas leaving the first catalytic converter 654 enters the by-pass conduit 664, which joins at the mixing valve 672 with the exhaust conduit 620 exiting the TEG 658. The second portion that passes through the by-pass conduit 664 maintains approximately the same temperature through the by-pass conduit, which is close to the temperature of the exhaust leaving the engine 620.

The exhausts from the TEG 658 and the by-pass conduit 664 combine, at the mixing valve 672, and are subjected to an injection of air from the oxidation air injection conduit 680, which can increase the oxygen concentration by volume of the exhaust to between about 0.25% and about 1.0%, including 0.50%, 0.75%, and any value therebetween. A thermocouple can measure the temperature Tmix of the combined exhaust stream downstream of the mixing valve 672 (i.e., between the mixing valve 672 and the second stage catalytic converter 666). A microprocessor-based controller can control the mixing valve 672 and/or the cooling unit (e.g., cooling air injection 669, a cooling water injector, a heat exchanger, and/or cooling coils) to adjust the temperature Tmix of the combined exhaust stream. In some embodiments, the controller adjusts the temperature Tmix to about 300-550° F., or any temperature or sub-range therebetween, as discussed above. The controller can employ P, PI, PID, or similar control algorithms to maintain Tmix at the desired temperature or temperature range.

Next, the exhaust is directed to the second stage catalytic converter 666, from which the exhaust issues through the outlet 670 with reduced nitrogen oxides, carbon monoxide, hydrocarbons, organic compounds, and/or hydrogen gas.

There is thus provided a further method for reducing nitrogen oxides, carbon monoxide, hydrocarbons, organic compounds, and/or hydrogen gas from exhausts of internal combustion engines and for generating electrical energy. The method comprises the steps of directing exhausts from the internal combustion engine to a first catalytic converter and dividing the exhausts therefrom into a first portion directed to a thermoelectric generator and a second portion bypassing the thermoelectric generator, the first and second exhaust portions joining at a mixing valve. Cooled exhaust is directed from the mixing valve and is subjected to air injection and thereafter directed to a second catalytic converter and from there to an exhaust outlet. The first exhaust portion passing through the thermoelectric generator enables the thermoelectric generator to generate electrical power. The temperature downstream of the mixing valve can be controlled, e.g., by controlling the ratio of bypass exhaust gas and TEG exhaust gas, to a temperature Tmix of 300-550° F., or any temperature or sub-range therebetween, as discussed above.

Figure 7:
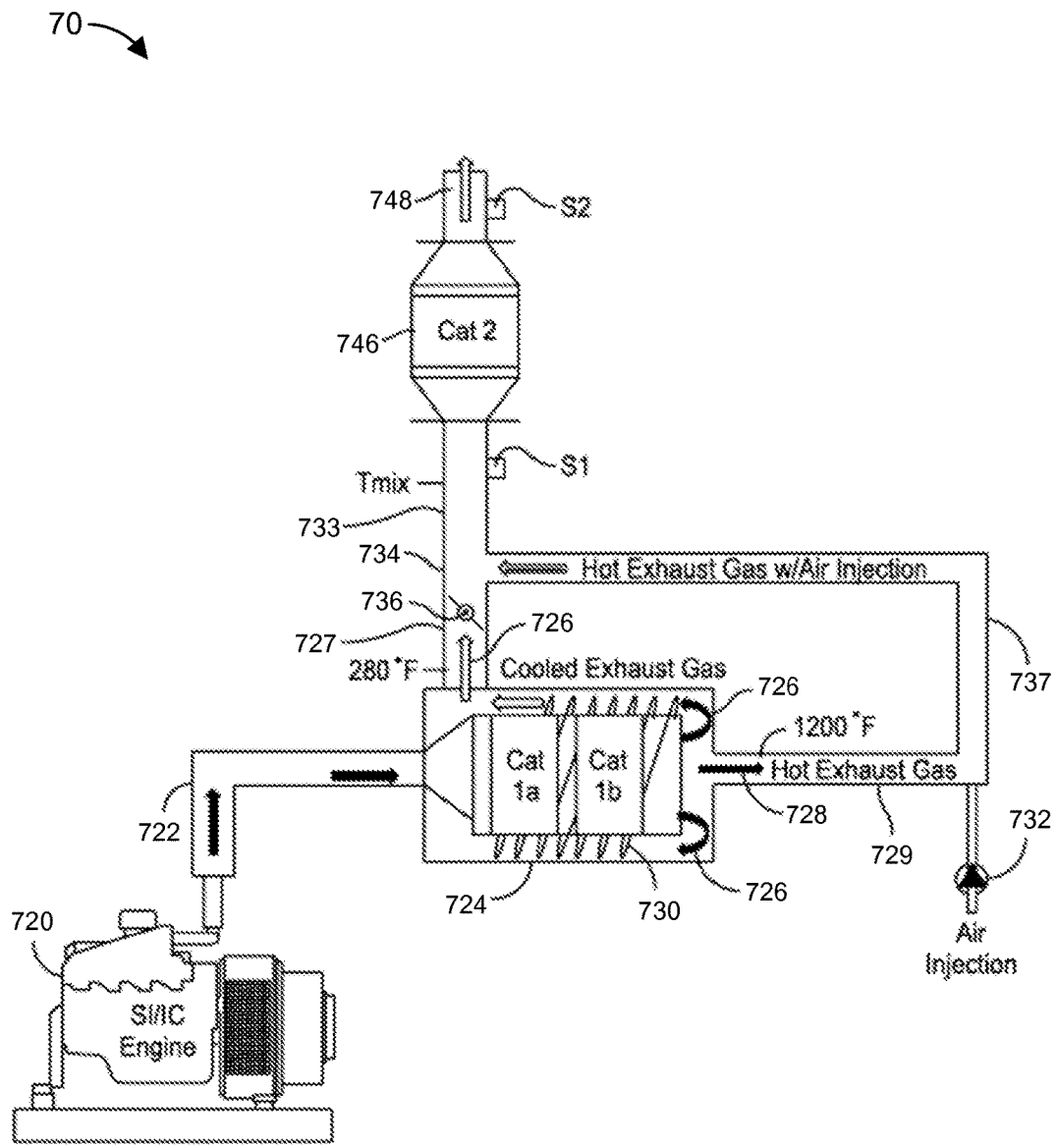
FIG. 7 is an apparatus having a two-stage system with inter-stage cooling according to an embodiment, which was used to perform testing.

Various tests were performed on a two-stage system with inter-stage cooling using an apparatus depicted in FIG. 7 according to an embodiment. As shown in FIG. 7, the engine exhaust gases exit SI/IC engine 720 and are channeled by an exhaust gas conduit 722 to a catalytic converter first stage 724, having at least one, and preferably two, catalytic converters, Cat 1 a and Cat 1 b, as discussed above. In some embodiments two catalytic converters can be disposed in a single substrate. The catalytic converter first stage 724 includes a reduction catalyst that, in some embodiments, can be a TWC. Two catalytic elements are preferred, instead of one, to achieve high performance in the first stage catalytic converter 724 relative to NOx removal. A single catalytic converter element works well for the disclosed system with a slightly compromised performance of the first stage 724.

The combustion gases from the engine 720 enter the first stage 724 at a normal engine exhaust temperature (about 800-1250° F.), after which the exhaust flow is split into two streams 726, 728. One stream 726 is cooled to about 280° F. as it passes over cooling unit 730, such as cooling coils, a cooling liquid injector, a heat exchanger, and/or a cooling air injector. The other stream 728 bypasses the cooling unit 730 and is injected with a controlled quantity of air from an air injector 732. The two streams 726, 728 rejoin, as at junction 734, then are piped into a second catalytic stage (Cat. 2) 746, which includes an oxidation catalyst. In some embodiments, the oxidation catalyst can be a TWC. The extent of the exhaust gas cooling can be adjusted with a temperature adjusting valve 736.

Three tests were conducted with this apparatus that demonstrate certain results using embodiments of the invention, the tests being summarized below. It is also contemplated that tests also apply to systems and methods that include a TEG (e.g., FIGS. 4-6 and 13).

Test 1.

In a first experiment, the engine 720 was operated at high output (156 bhp and 2500 rpm) and fueled by natural gas. The temperature adjusting valve 736 was set such that most of the gases bypassed the cooling unit 730. Under steady state engine operation, and with the engine AFR fixed at a stoichiometric AFR (or near stoichiometric) that favors $NO_x$ reduction out of the Stage 1 catalysts 724, the experiment summarized in FIG. 8 was initiated.

During the first 200 seconds and with no inter-stage air injection, the concentrations of NOx, CO, and $O_2$ in the exhaust system, as well as the inter-stage exhaust temperature (Tmix) were measured at port S1 (FIG. 7). In this time frame, and with sampling at S1, the emissions of NOx were well below the compliance limit, while CO values were noncompliant. Further, the inter-stage exhaust temperature was high, as expected (about 800° F.), while the $O_2$ concentration (by volume) was very close to zero, indicative of near-stoichiometric operation. At 200 seconds and in preparation of air injection to begin, the sample port was moved to S2 (FIG. 7), immediately after the second stage catalyst (Cat 2 746). As expected, the CO and NOx concentrations (by volume) measured after the second stage were modestly lower with the benefit of the additional catalyst element.

Figure 8:
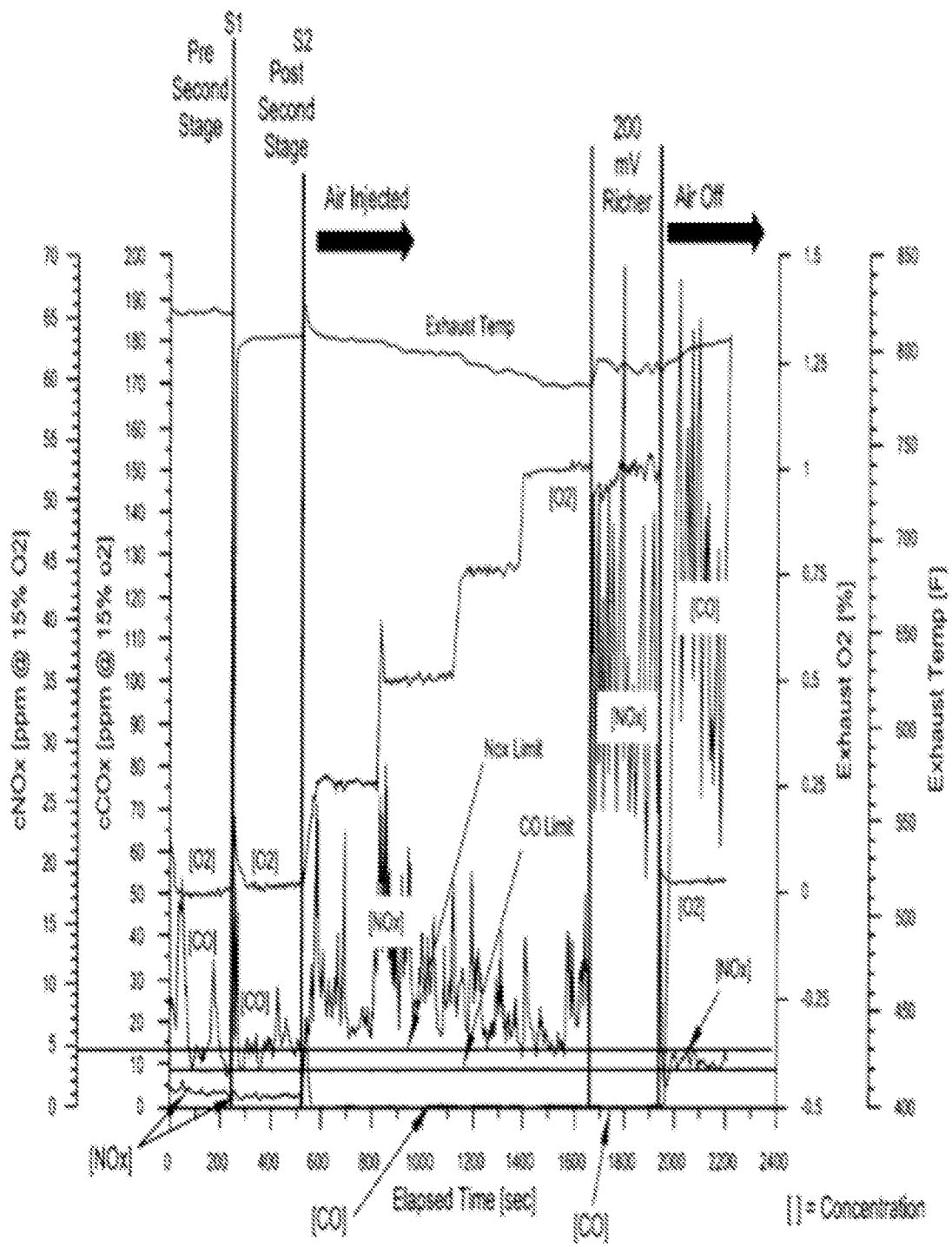
FIG. 8 is a chart illustrating the results of a Test 1 described hereinbelow.

At 520 seconds inter-stage air injection was initiated, as is clearly indicated in FIG. 8 by the step change in $O_2$ concentration at port S2. CO immediately decreased to near zero, but NOx levels sharply increased, demonstrating the disappointing result obtained in the past without benefit of this invention.

As air injection was increased stepwise at 800, 1100, and 1400 seconds, the NOx improved slightly, but remained highly noncompliant. At 1660 seconds, a change in the engine combustion was made to a richer value, which only worsened the NOx emissions.

Figure 1:
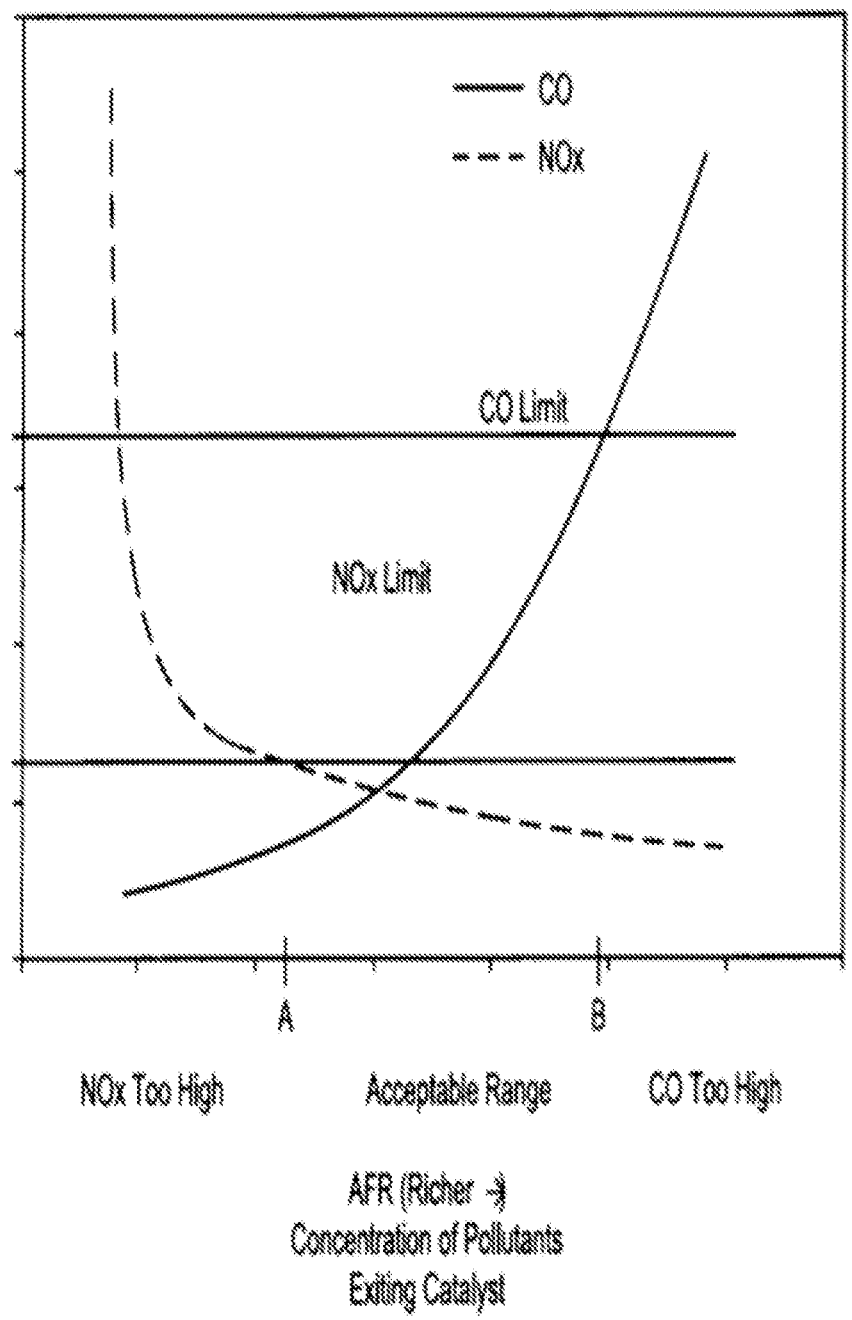
FIG. 1 is a chart depicting prior art relationships between nitrogen oxides and carbon monoxide present in engine exhausts gases, within and beyond acceptable ranges, given a precisely controlled air/fuel ratio.
Figure 2:
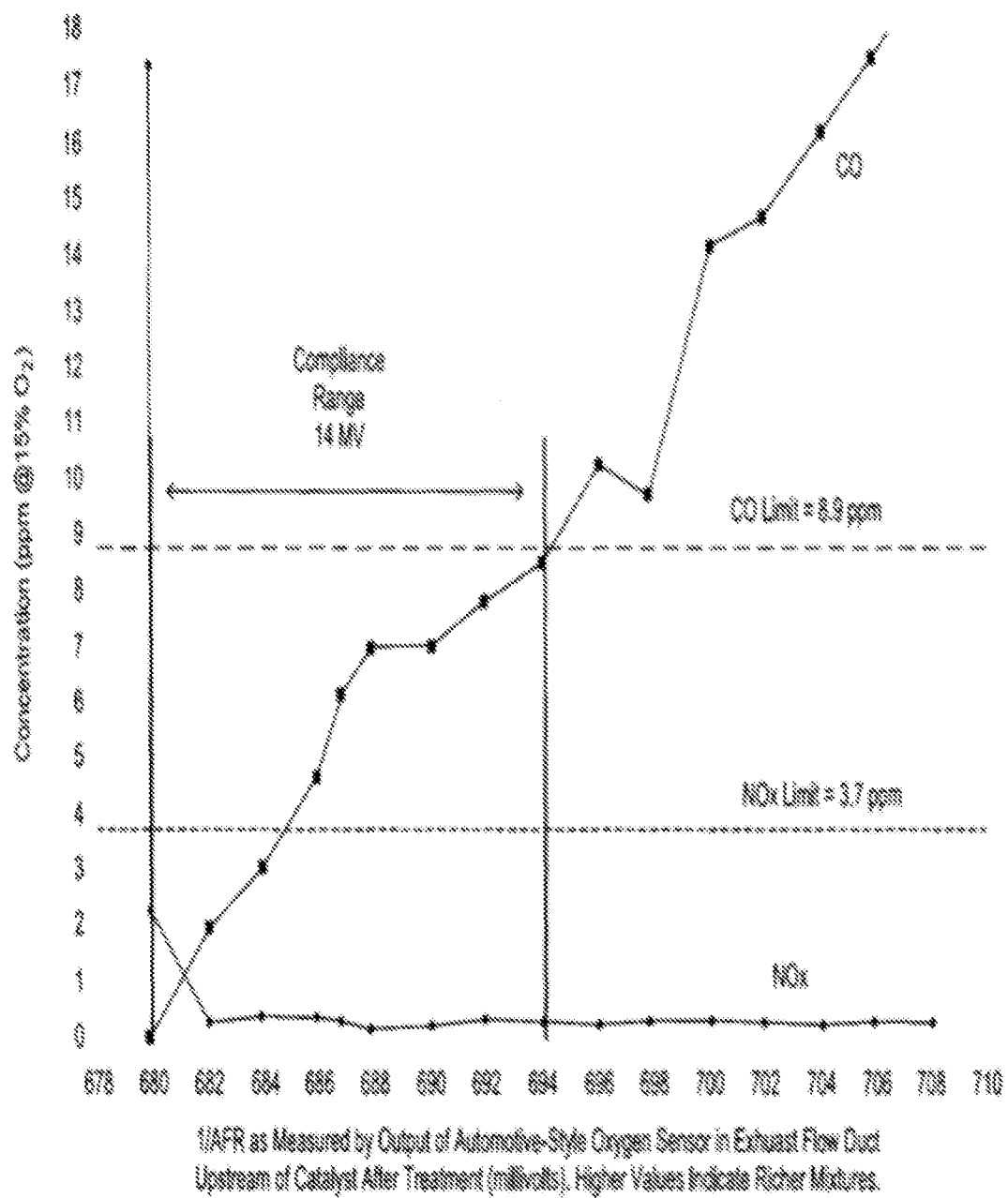
FIG. 2 is a chart illustrating the prior art steady-state air/fuel ratio control required for a standard engine, using a three-way catalyst.
Figure 3:
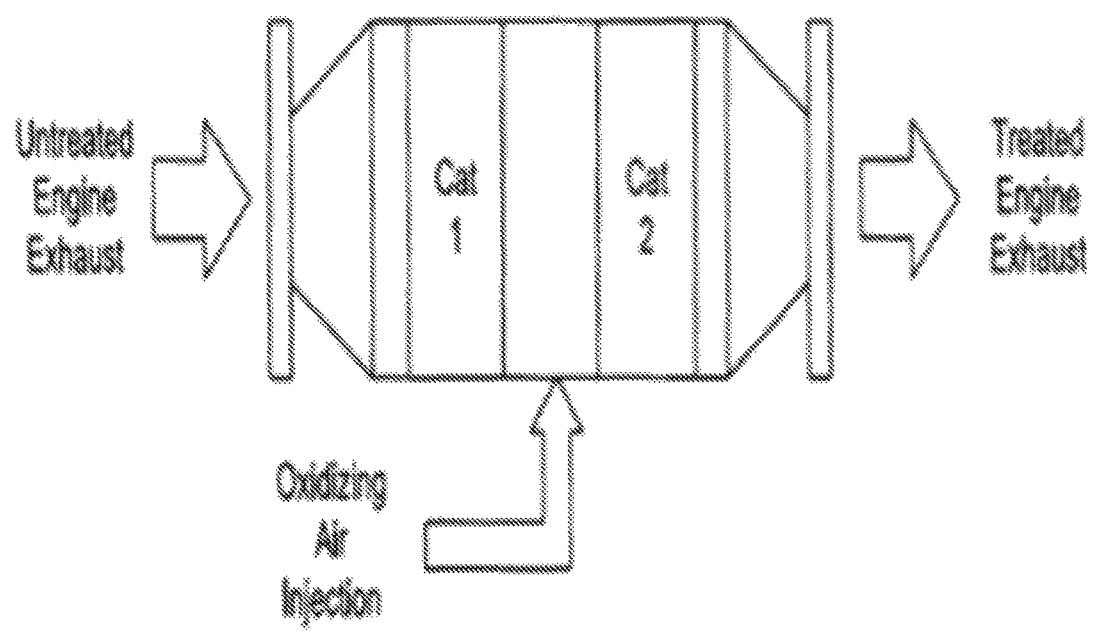
FIG. 3 is a diagrammatic depiction of a prior art two-stage catalyst system with inter-stage oxidizing air injection.

At 1950 seconds, the air injection was discontinued, essentially returning the process to a single stage. In this final time segment, operating as a single stage system with a rich AFR, the NOx concentration was measured to be low, while the CO was found to be high, the expected result (see FIG. 1).

Test 2.

Figure 9:
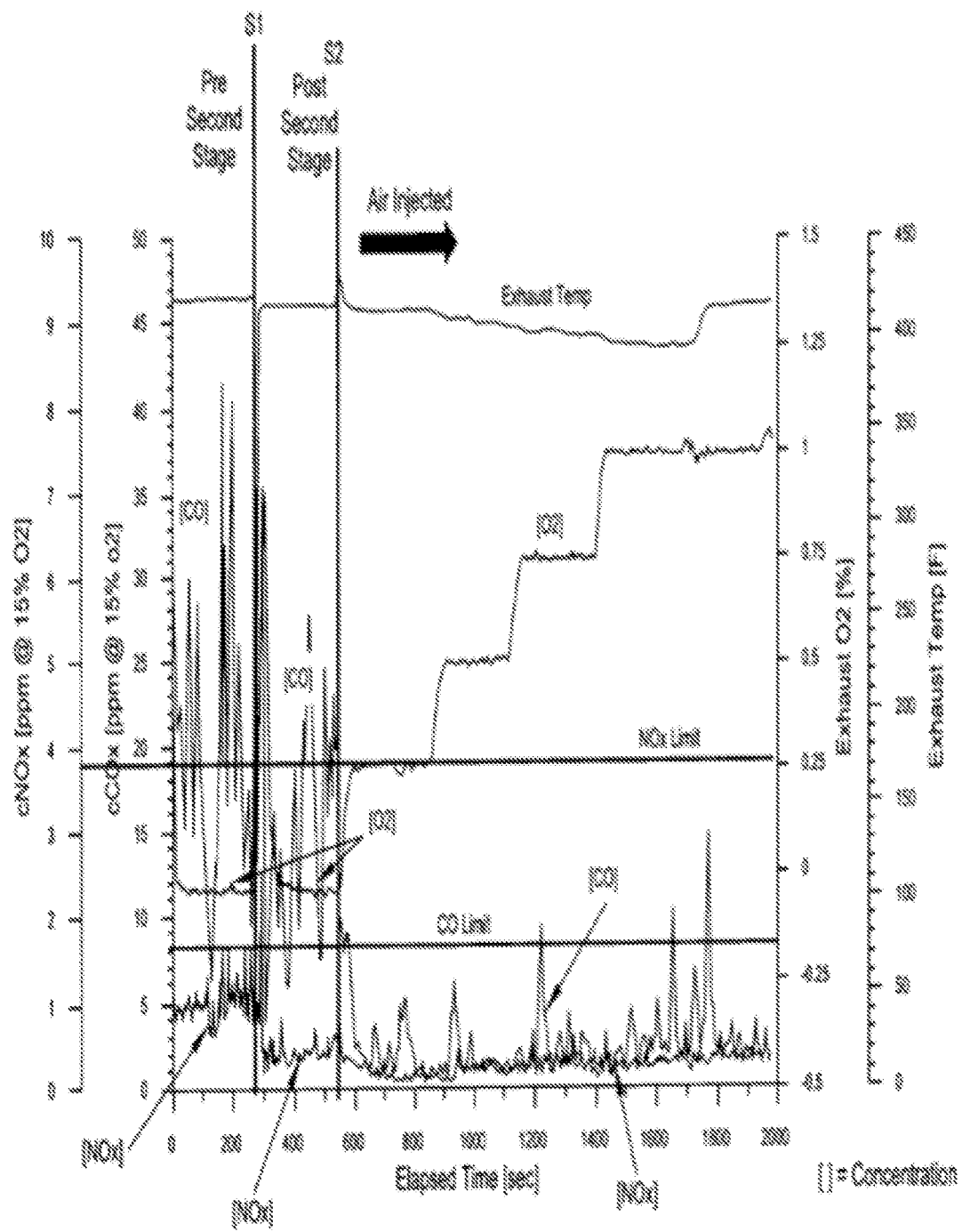
FIG. 9 is a chart similar to FIG. 8, but illustrating markedly different and greater improved reductions of nitrogen oxides and carbon monoxide.

In a second experiment, Test 1 was repeated, but with inter-stage cooling increased to achieve lower "Tmix" values (about 375-400° F.). The results, shown in FIG. 8, were markedly different. When air injection commenced at 550 seconds, the NOx concentration decreased from 0.5 PPM to approximately one half of the value, while the CO likewise reduced to concentrations well below compliance limits. Compliance testing is based on time average data taken over extended intervals with short-term spikes, such as those seen in Test 2 (FIG. 9), and which are permitted as long as they are not excessive.

The air injection, which had substantially negative effect on emissions at the higher temperature, was highly effective in improving the process when inter-stage cooling was substantially increased. It is important that the NOx reduction was not anticipated and is a very significant benefit of the process.

Test 3.

Figure 10:
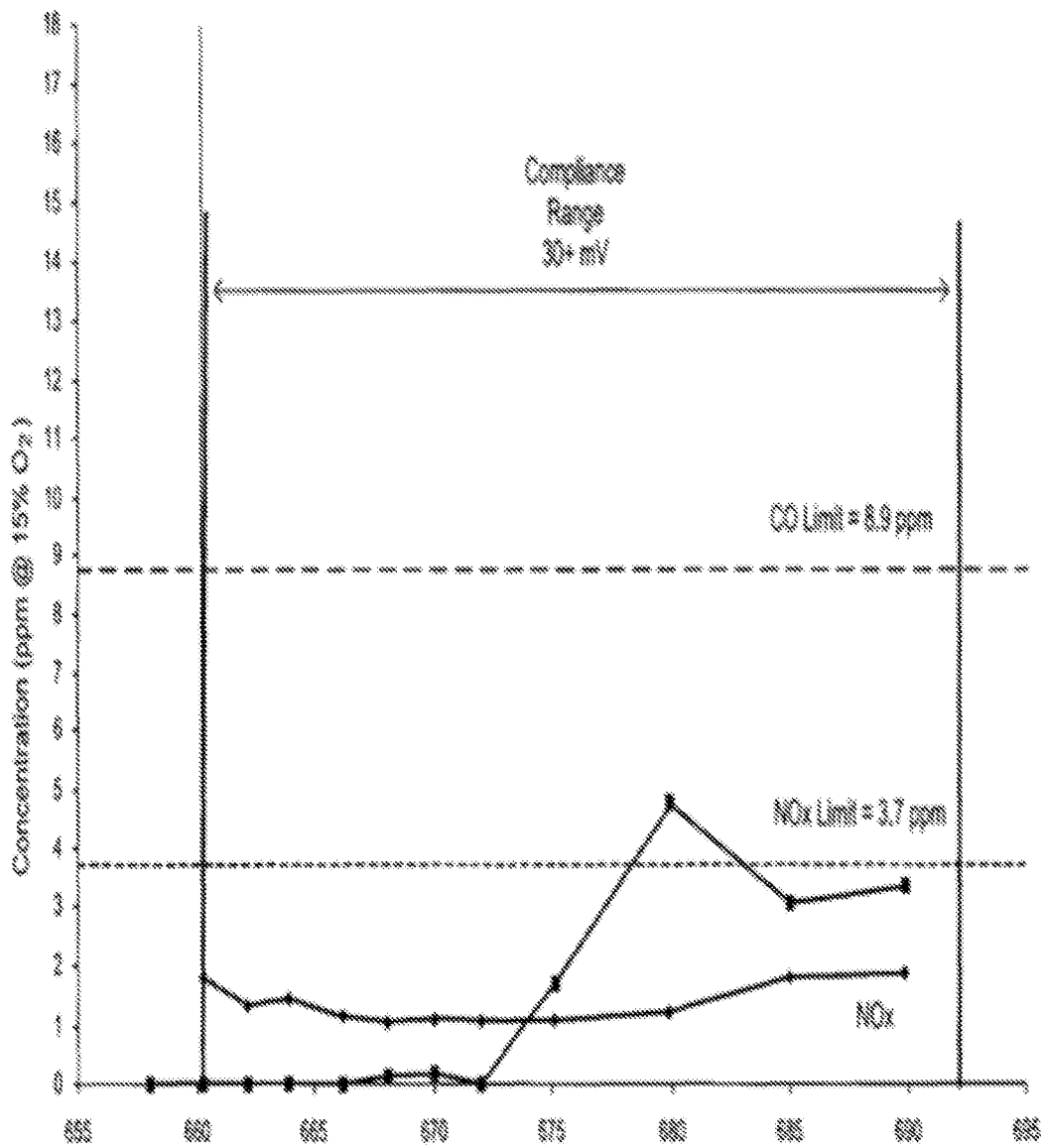
FIG. 10 is a chart showing that even with maladjustment of an air-to-fuel ratio controller, the inventive assemblies and methods provide for lower emissions and greater tolerance for excursions in engine air-to-fuel ratios.

In a third test, the system was first adjusted to a steady state condition that provided near optimum performance, namely inter-stage cooling to about 520° F. with air injection equal to about 1% of the primary combustion air by volume. Next, an engine air to fuel ratio controller was adjusted stepwise to alternate steady state operating points, both richer and leaner, to determine the tolerance of the process to maladjustment. The results, shown in FIG. 10, indicate that the process was successfully compliant with lambda sensor readings from 660 mV to greater than 692 mV, essentially double the compliance window of the single stage catalyst system.

As a result of Tests 2 and 3, one skilled in the art would understand that any temperature between about 375-520° F. would achieve the same or substantially the same results. It is contemplated that temperatures of about 300-550° F. could also be used to achieve these results. It is also contemplated that the results of the above tests apply to systems and methods that include a TEG (e.g., FIGS. 4-6 and 13).

The new assembly and method provides, therefore, both lower emissions and greater tolerance for excursions in engines with air-fuel ratio under steady-state (non-dithering) fuel control. The same phenomenon and conclusions are applicable to dithering fuel control strategies, but with increases in the AFR compliance window, as measured by post-catalyst exhaust oxygen or lambda sensors.

There is thus provided by the present invention an assembly 70, shown in FIG. 7, for reducing nitrogen oxides, carbon monoxide, organic compounds, hydrocarbons, and/or hydrogen gas in internal combustion engine exhausts. The assembly 70 comprises a first exhaust conduit 722 having an exhaust receiving end for connecting to and extending from an internal combustion engine 720, which can operate at a stoichiometric or near stoichiometric AFR. The assembly 70 also includes a first stage catalytic converter 724 (e.g., a reduction catalyst such as a TWC) in communication with a dispensing end of the first exhaust conduit 722, cooling means, such as cooling coils 730 (or cooling air/liquid injector), disposed on the first stage catalytic converter 724 for cooling a first portion of engine exhausts received from the first exhaust conduit 722.

The assembly further includes a first outlet conduit 727 for facilitating movement of the cooled first portion stream 726 of engine exhausts from the first stage catalytic converter 724, a second outlet conduit 729 for facilitating movement of the second stream 728 of engine exhausts received from the first stage catalytic converter 724, an air injection conduit 737 which receives air from the air injector 732 and is in communication with the second outlet conduit 729 for cooling the second portion of engine exhausts, a second exhaust gas conduit 733 in communication with the first outlet conduit 727 and the air injection conduit 737, and a second stage catalytic converter 746 (e.g., an oxidation catalyst such as a TWC) in communication with the second exhaust gas conduit 733 and having an exhaust emitting outlet 748. The first outlet conduit 727 may optionally be provided with a temperature-adjusting valve 736.

In operation of the assembly of FIG. 7, exhaust gases from the engine 720 pass through the first exhaust conduit 722 and into the first stage catalytic converter 724 wherein a portion 726 of the exhaust is cooled (e.g., by cooling coils, a cooling air injector, and/or a cooling fluid injector) and passed on to the first outlet conduit 727. A second portion 728 of the exhaust is not substantially cooled and is passed on to the second outlet conduit 729.

The air injector 732 injects air into the second outlet conduit 729. The hot exhaust gas of the second exhaust stream 728 and injected air proceed through the air injection conduit 737 and merge with the cooled stream 726 of exhaust gas and proceed to the second catalytic converter stage 746 and exit therefrom at outlet 748. The merged stream can have a mixed temperature Tmix of about 300-550° F., or any temperature or sub-range therebetween, as discussed above. In addition, the merged stream can have an oxygen concentration by volume of between about 0.25% to about 1.0%, including 0.50%, 0.75%, and any value therebetween.

There is further provided in conjunction with the assembly 70, shown in FIG. 7, a method for reducing nitrogen oxides, carbon monoxide, organic compounds, hydrocarbons, and/or hydrogen gas from exhausts of internal combustion engines that operate at a stoichiometric or near stoichiometric AFR. The method comprises the steps of conveying the engine exhaust to a first stage catalytic converter 724, cooling a first portion of the engine exhaust in the first stage catalytic converter 724 and removing the cooled first portion from the catalytic converter through a first exhaust gas outlet conduit 727, removing a non-cooled portion of the engine exhaust from the catalytic converter 724 through a second exhaust gas outlet conduit 729, controlling the mixing of the cooled and non-cooled portions to obtain a mixed exhaust gas having a Tmix to 300-550° F., or any temperature or sub-range therebetween, as discussed above. The method also includes injecting air into the second outlet conduit 729 so that the mixed exhaust has an increased oxygen concentration by volume of between about 0.25% to about 1.0%, including 0.50%, 0.75%, and any value therebetween. The method also includes conveying the non-cooled second portion of the engine exhaust and the injected air through air injection conduit 737 to the first exhaust gas outlet conduit 727 to join with the cooled first portion of the engine exhaust in the air injection conduit 737.

The method further comprises directing the exhaust in the exhaust gas conduit 733 to a second stage catalytic converter 746, and discharging exhaust from the second stage catalytic converter 746, whereby to provide engine exhausts of less nitrogen oxides and less carbon monoxide content.

Figure 11:
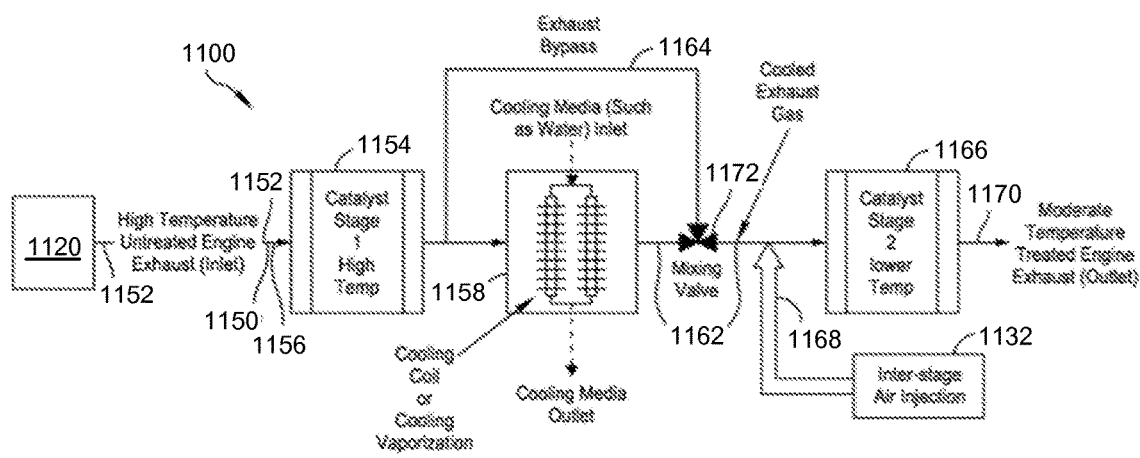
FIG. 11 is an apparatus having a two-stage system with inter-stage cooling according to an embodiment.

There is further provided an alternative embodiment 1100 of the assembly for reducing nitrogen oxides, carbon monoxide, organic compounds, hydrocarbons, and/or hydrogen gas in internal combustion engine exhausts, the alternative assembly 1100 being shown in FIG. 11 and comprising a first exhaust conduit 1150 having an exhaust receiving end 1152 connected to and extending from an internal combustion engine 1120, which can operate at a stoichiometric or near stoichiometric AFR. The assembly 1100 also includes a first stage catalytic converter 1154 (e.g., a reduction catalyst such as a TWC) in communication with a dispensing end 1156 of the first exhaust conduit 1150. A cooling unit 1158 is in communication with the first stage catalytic converter 1154 for cooling a first portion of engine exhausts received from the first stage catalytic converter 1154, and a conduit 1162 for the cooled exhaust, the conduit 1162 extending from the cooling unit 1158.

The assembly 1100 further includes a cooling unit by-pass 1164 in communication with the output of the first stage catalytic converter 1154 and the conduit 1162 for cooled exhaust.

A second stage catalytic converter 1166 (e.g., an oxidation catalyst such as a TWC) is in communication with the cooled exhaust conduit 1162 and the cooling unit by-pass conduit 1164. An air injection conduit 1168 is in communication with the cooled exhaust conduit 1162. An exhaust outlet 1170 extends from the second stage catalytic converter 1166.

In operation of the assembly of FIG. 11, exhaust gases from the engine 1120 flow to the first stage catalytic converter 1154. A first portion of the exhaust leaving the first catalytic converter stage 1154 is directed to the cooling unit 1158 (e.g., cooling coils, a cooling air injector, a heat exchanger, and/or a cooling fluid injector). A second portion of the exhaust leaving the first catalytic converter stage 1154 enters a cooling unit bypass conduit 1164 which joins the cooled exhausts conduit 1162 exiting the cooling unit 1158.

The combined exhaust from the cooling unit 1158 and the by-pass conduit 1164 combine, as at mixing valve 1172, and are subjected to an injection of air from the air injector 1132, and directed to the second stage catalytic converter 1166, from which the exhaust exits through the outlet 1170 with greatly reduced nitrogen oxides and carbon monoxide. The temperature of the mixed exhaust from the cooling unit 1158 and the by-pass conduit 1164 can be controlled to be at a Tmix to about 300-550° F., or any temperature or sub-range therebetween, as discussed above. The air injector 1132 can increase the oxygen concentration by volume of the mixed exhaust to between about 0.25% to about 1.0%, including 0.50%, 0.75%, and any value therebetween.

There is further provided in conjunction with the assembly 1100, shown in FIG. 11, a method for reducing nitrogen oxides, carbon monoxide, organic compounds, hydrocarbons, and/or hydrogen gas from exhausts of internal combustion engines.

The method comprises the steps of conveying the engine exhausts to the first stage catalytic converter 1154 and conveying the engine exhaust from the first stage catalytic converter 1154 in part to the cooling unit 1158 and in part to the cooling unit by-pass 1164, and mixing exhausts from the cooling unit 1158 and the cooling unit by-pass 1164 in the cooled exhaust conduit 1162. The mixed exhaust can have a temperature of Tmix of about 300-550° F., or any temperature or sub-range therebetween, as discussed above. The method also includes injecting air through the air injection conduit 1168 into the cooled exhaust conduit 1162 to increase the oxygen concentration by volume of the cooled exhaust to between about 0.25% and about 1.0%, including 0.50%, 0.75%, and any value therebetween. The method also includes directing the cooled exhaust (i.e., exhaust from the cooling unit 1158, and from the cooling unit by-pass 1164, and from the injected air conduit 1168) to the second stage catalytic converter 1166, and discharging through the outlet 1170 the engine exhausts thus treated, whereby to provide engine exhausts of less nitrogen oxides and less carbon monoxide content.

In accordance with a still further feature of the invention there is provided a method for reducing nitrogen oxides, carbon monoxide, organic compounds, hydrocarbons, and/or hydrogen gas in exhausts of spark-ignited gaseous fueled internal combustion engines that operate at a stoichiometric or near stoichiometric AFR. The method comprises the steps of directing the exhausts from an engine 720, 1120 (FIGS. 7 and 11) to a first stage catalytic converter 724, 1154, directing a first portion of exhaust output from the first stage catalytic converter 724, 1154 to a cooling unit 730, 1158 and thence to a cooled exhaust conduit 726, 1162, directing a second portion of exhaust output from the first stage catalytic converter 724, 1154 to a non-cooled exhaust gas conduit 728, 1164, uniting the first and second portions of exhaust gas where the united exhaust gas has a temperature of Tmix to about 300-550° F., or any temperature or sub-range therebetween, as discussed above. The method also includes injecting air into a selected one of (1) the non-cooled exhaust conduit 729, 1164, (2) the cooled exhaust conduit 726, 1162, and (3) the united cooled and non-cooled exhausts after the uniting thereof. The injected air can increase the oxygen concentration by volume to between about 0.25% and about 1.0%, including 0.50%, 0.75%, and any value therebetween. The method also includes directing the united exhaust gas to a second catalytic converter 746, 1166.

Figure 12:
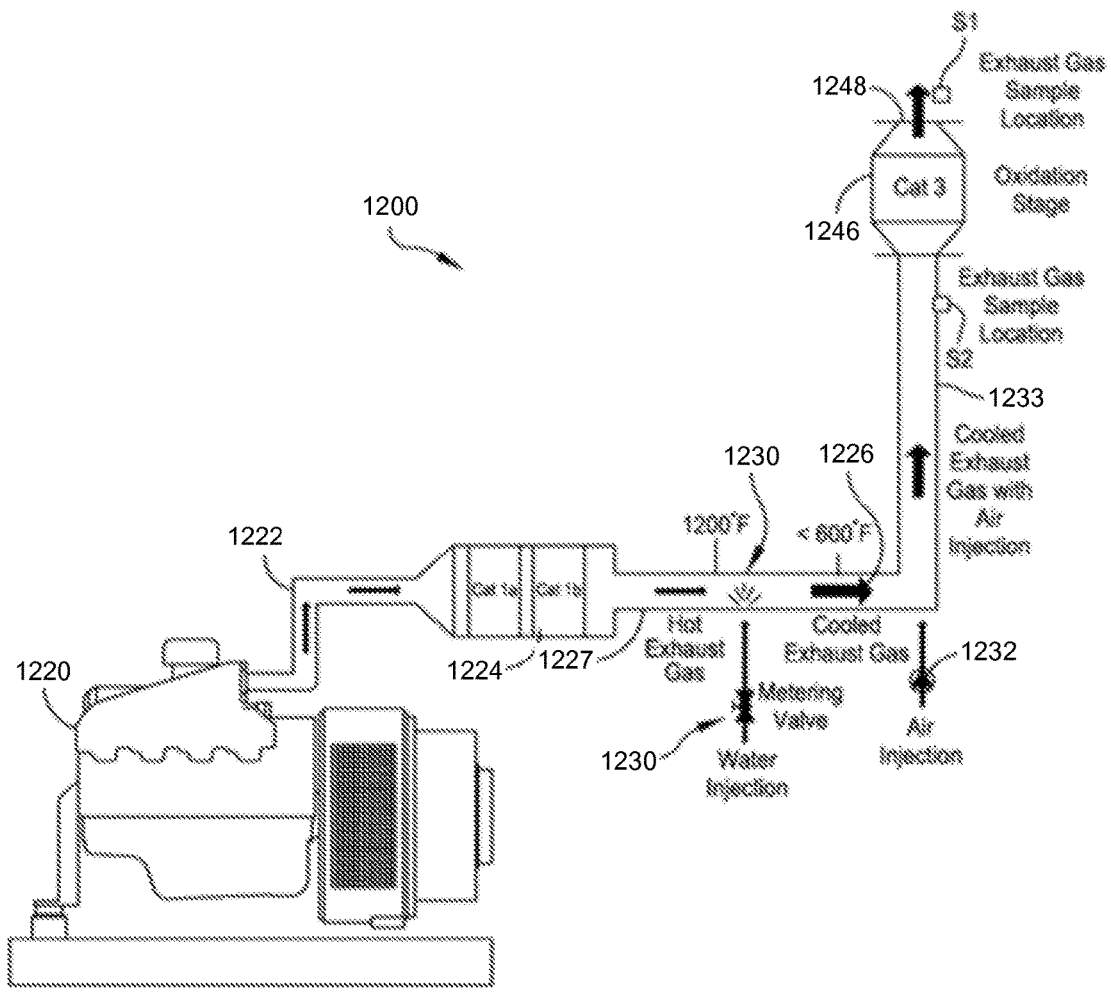
FIG. 12 is an apparatus having a two-stage system with inter-stage cooling according to an embodiment.

In an alternative embodiment 1200 of the system of FIG. 7, for use in situations in which the load is steady and the liquid used for cooling is maintained at a steady rate, the embodiment of FIG. 12 can be provided and operated without the hot exhaust gas outlet conduit 729 and the injection conduit 737 shown in FIG. 7.

Thus, the alternative embodiment of the FIG. 7 assembly, shown in FIG. 12, comprises an exhaust conduit 1222, a cooling unit 1230 (e.g., cooling coils, cooling air injector, cooling fluid injector, or a vaporization construction), an outlet conduit 1227, an exhaust gas conduit 1233, an air injector 1232 disposed to inject air into the exhaust gas conduit 1233, and a second stage catalytic converter 1246 and its outlet 1248.

The method for reducing nitrogen oxides, carbon monoxide, organic compounds, hydrocarbons, and/or hydrogen gas in exhaust from internal combustion engines utilizing the assembly shown in FIG. 12 comprises the steps of directing exhaust from the internal combustion engine to a first stage catalytic converter. The exhaust can be generated by an SI/IC engine operating at a stoichiometric or near stoichiometric AFR, which can provide an exhaust having an oxygen concentration by volume of close to zero, e.g., less than about 0.25%, less than about 0.10%, less than about 0.05%, or less than about 0.01%. The method also includes cooling the exhausts from the first stage catalytic converter (e.g., to a temperature of about 300-550° F., or any temperature or sub-range therebetween, as discussed above). The method also includes directing the cooled exhausts toward a second stage catalytic converter, and injecting air into the cooled exhausts to increase the oxygen concentration by volume to between about 0.25% and about 1.0%, including 0.50%, 0.75%, and any value therebetween. The method also includes directing the air-cooled exhausts into the second catalytic converter, and discharging the exhausts therefrom.

Figure 13:
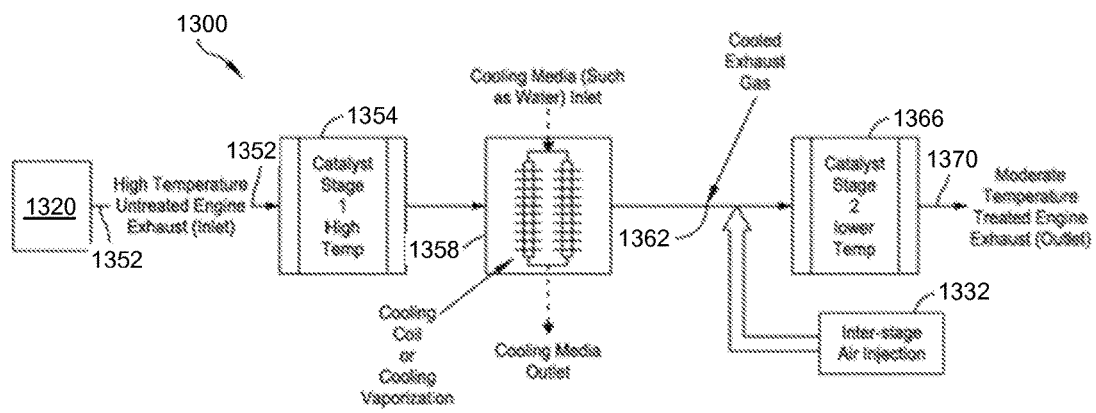
FIG. 13 is an apparatus having a two-stage system with inter-stage cooling according to an embodiment.

Similarly, an alternative embodiment 1300 (FIG. 13) can effect the desired lowering of emissions in a system maintained at a steady load and a steady rate, in which the exhaust by-pass 1164 and mixing valve 1172 are omitted from the assembly, as is illustrated in FIG. 13.

The alternative embodiment of FIG. 13 comprises an assembly 1300 that is the same as that shown in FIG. 11 but without the exhaust by-pass 1164 and the mixing valve 1172. That is, the assembly comprises an exhaust conduit 1352, a first stage catalytic converter 1354 in communication with a cooling unit, the cooling unit 1358 having cooling coils, a cooling air injector, a cooling fluid injector, a heat exchanger, and/or a cooling vaporization facility. The assembly 1300 further includes air injector 1332 for injecting air into an output line 1362 from the cooling unit 1358, and a second stage catalytic converter 1366 with an outlet 1370 for treated exhausts.

The method for reducing nitrogen oxides, carbon monoxide and, organic compounds, hydrocarbons, and/or hydrogen gas in exhausts from internal combustion engines utilizing the assembly shown in FIG. 13 comprises the steps of directing exhausts from the internal combustion engine to the first catalytic converter. The exhaust can be generated by an SI/IC engine operating at a stoichiometric or near stoichiometric AFR, which can provide an exhaust having an oxygen concentration by volume of close to zero, e.g., less than about 0.25%, less than about 0.10%, less than about 0.05%, or less than about 0.01%. The method also includes cooling the exhausts from the first catalytic converter (e.g., to about 300-550° F., or any temperature or sub-range therebetween, as discussed above), injecting air into the cooled exhausts (e.g., to increase the oxygen concentration by volume of the cooled exhausts to between about 0.25% to about 1.0%, including 0.50%, 0.75%, and any value therebetween), directing the cooled exhausts into a second stage catalytic converter, and discharging the exhausts from the second catalytic converter.

Figure 14:
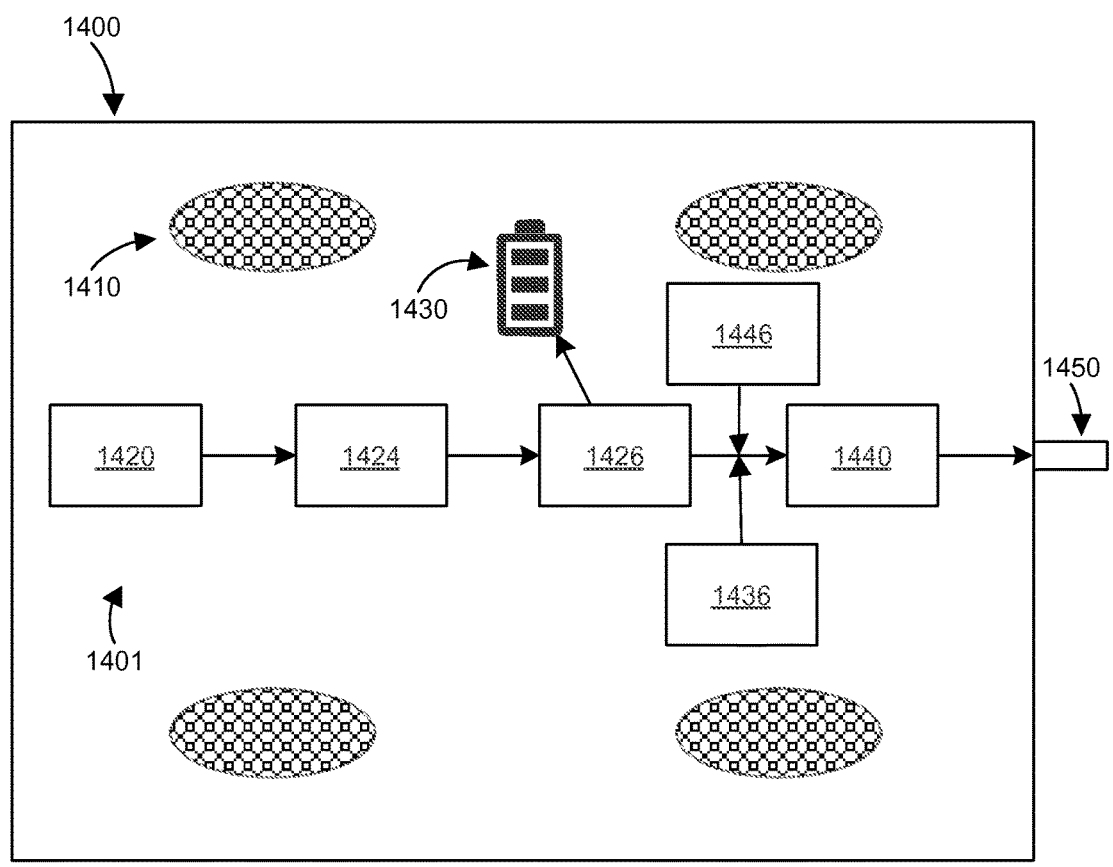
FIG. 14 is a block diagram of an underside of a vehicle that includes an exhaust and emissions system according to an embodiment.

FIG. 14 illustrates a block diagram of an underside of a vehicle 1400 that includes an exhaust and emissions system 1401 similar to the systems described above. The system 1401 is in fluid communication with a SI/IC engine 1420 that can operate at a stoichiometric or near stoichiometric AFR. The engine 1420 propels the vehicle 1400 via wheels 1410 and outputs an exhaust stream having an oxygen concentration by volume of close to zero, as discussed above. The exhaust stream is at a high temperature (e.g., about 800°-1250° F.). The exhaust stream is directed to a first-stage catalytic converter 1424, which includes a reduction catalyst. In some embodiments, the first-stage catalytic converter 1424 is a TWC. The first stage catalytic converter 1424 can remove (e.g., via reduction) NOx compounds from the exhaust stream.

The output of the first stage catalytic converter 1424 is in fluid communication with an input of TEG 1426. The TEG 1426 converts thermal energy in the exhaust stream to electricity, which can be used to charge a battery 1430. The exhaust at the output of the TEG 1426 has a lower thermal energy (and thus a lower temperature) than the exhaust at the input of the TEG 1426.

The output of the TEG 1426 is in fluid communication via a conduit or pipe with an input of a second stage catalytic converter 1440, which includes an oxidation catalyst. In some embodiments, the second stage catalytic converter 1440 is a TWC. The second stage catalytic converter 1440 can remove (e.g., via oxidation) CO and, hydrogen gas, and/or organic compounds from the exhaust stream. An output of second stage catalytic converter 1440 is in fluid communication with an exhaust pipe 1450. Additional components can be disposed between the second stage catalytic converter 1440 and the exhaust pipe 1450 such as a muffler.

Before the exhaust enters the second stage catalytic converter 1440, the exhaust is optionally cooled by cooling unit 1446 and oxygenated by gas injector 1436. The cooling unit 1446 removes thermal energy from the exhaust stream to decrease the temperature of the exhaust stream, for example to about 300-550° F., or any temperature or sub-range therebetween, as discussed above. Alternatively, the TEG 1426 cools the exhaust stream to about 300-550° F. without additional cooling from the cooling unit 1446. The gas injector 1436 increases the oxygen content by volume of the exhaust stream to between about 0.25% and about 1.0%, or any value or sub-range therebetween.

The exhaust and emissions system 1401 can include any of the variations and embodiments described above including a bypass conduit that bypasses the TEG 1426.

As would now be appreciated, the above systems and processes remove undesired pollutants in exhaust streams of SI/IC engines while also generating electrical energy. In addition to improving emissions, such systems and methods can increase the efficiency through the generated electrical energy. An embodiment is a vehicle having two catalysts and a TEG therebetween. The TEG can power an electrical component of the vehicle. The first catalyst removes (by reduction) NOx from the exhaust stream. The second catalyst removes (by oxidation) CO from the exhaust stream. Prior to entering the second catalyst, the exhaust stream is oxygenated and cooled.

The present invention should not be considered limited to the particular embodiments described above, but rather should be understood to cover all aspects of the invention as fairly set out in the present claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. An exhaust system for a vehicle, said system comprising:
a three way catalytic converter (TWC) having a TWC input in fluid communication with an engine output of a spark-ignited internal combustion engine disposed in said vehicle, said engine generating an exhaust stream while operating at a stoichiometric air-fuel ratio, said TWC configured to remove nitrogen oxides (NOx) from said exhaust stream;
a thermoelectric generator (TEG) having a TEG input in fluid communication with a TWC output of said TWC, said TEG configured to convert a first thermal energy of said exhaust stream to an electrical energy, said TEG outputting a TEG output exhaust stream having a second thermal energy, said second thermal energy less than said first thermal energy;
a battery in electric communication with said TEG, said battery configured to store said electrical energy;
a gas injector in fluid communication with said TEG output exhaust stream, said gas injector configured to increase an oxygen content of said TEG output exhaust stream; and
an oxidation catalyst (OxCat) having an OxCat input in fluid communication with a TEG output of said TEG, said OxCat configured to remove a carbon monoxide, hydrocarbon, or other organic compound content of said TEG output exhaust stream,
wherein said gas injector is disposed between said TEG and said OxCat.

2. The system of claim 1 further comprising a cooling unit disposed between said TEG and said OxCat, said cooling unit configured to cool said TEG output exhaust stream.

3. The system of claim 2, wherein said cooling unit comprises a cooling air injector.

4. The system of claim 2, wherein said cooling unit comprises at least one of a cooling water injector, a heat exchanger, or a cooling coil.

5. The system of claim 1, wherein said battery is in electrical communication with an electrical component of said vehicle.

6. The system of claim 5, wherein said electrical component includes at least one of sound system, a climate control system, a defroster, a power seat, a seat warmer, a windshield wiper, or a power window.

7. The system of claim 1, wherein said battery is in electrical communication with an electric motor, said electric motor configured to propel said vehicle.

8. The system of claim 1, wherein said gas injector is in fluid communication with an air source or a compressed air source.

9. The system of claim 1, wherein said OxCat includes a second TWC.

10. The system of claim 1, further comprising:
a bypass fluid conduit having an input disposed between said TWC and said TEG and an output disposed between said TEG and said OxCat, said bypass fluid conduit configured to bypass a bypass portion of said exhaust stream around said TEG;

a mixing valve configured to join said bypass portion with said TEG output exhaust stream;

a microprocessor-based controller in electrical communication with said mixing valve, said controller configured to control said mixing valve to adjust a temperature of said TEG output exhaust stream; and a thermocouple disposed to monitor said temperature of said TEG output exhaust stream, said thermocouple in electrical communication with said controller.

11. The system of claim 10, further comprising a cooling unit disposed between said TEG and said OxCat, said cooling unit configured to cool said TEG output exhaust stream to about 300-550° F.

12. The system of claim 11, wherein said cooling unit is configured to lower said temperature to about 400-500° F.

13. The system of claim 10, wherein said gas injector increases said oxygen content to about 0.25-1.0%.

14. The system of claim 10, wherein said gas injector increases said oxygen content from a first oxygen content of less than or equal to 0.10% to a second oxygen content of greater than or equal to 0.25%.

15. A vehicle comprising:
a spark-ignited internal combustion engine to propel said vehicle while operating at a stoichiometric air-fuel ratio;
an exhaust and emissions system in fluid communication with an engine output of said engine, said exhaust and emissions system comprising:
a three way catalytic converter (TWC) having a TWC input in fluid communication with said engine output of said engine, said TWC input receiving an exhaust stream from said engine output, said TWC configured to remove nitrogen oxides (NOx) from said exhaust stream;
a thermoelectric generator (TEG) having a TEG input in fluid communication with a TWC output of said TWC, said TEG configured to convert a first thermal energy of said exhaust stream to an electrical energy, said TEG outputting a TEG output exhaust stream having a second thermal energy, said second thermal energy less than said first thermal energy;
a gas injector in fluid communication with said TEG output exhaust stream, said gas injector configured to increase an oxygen content of said TEG output exhaust stream; and
an oxidation catalyst (OxCat) having an OxCat input in fluid communication with a TEG output of said TEG, said OxCat configured to remove a carbon monoxide, hydrocarbon, or other organic compound content of said TEG output exhaust stream,
wherein said gas injector is disposed between said TEG and said OxCat;
a battery in electric communication with said TEG, said battery configured to store said electrical energy; and
an electrical component of said vehicle in electrical communication with said battery.

16. The vehicle of claim 15 further comprising a cooling unit disposed between said TEG and said OxCat, said cooling unit configured to cool said TEG output exhaust stream.

17. A method comprising:
operating a spark-ignited internal combustion engine at a stoichiometric air-fuel ratio, said engine to propel a vehicle;
directing an exhaust stream from the engine to a three-way catalytic converter (TWC);
removing nitrogen oxides (NOx) from said exhaust stream in said TWC to generate a TWC output exhaust stream;
directing said TWC output exhaust stream to a thermoelectric generator (TEG);
in said TEG, converting a thermal energy of said TWC output exhaust stream to an electrical energy, said TEG generating a TEG output exhaust stream;
increasing an oxygen content of said TEG output exhaust stream;
after said increasing said oxygen content and said cooling, directing said TEG output exhaust stream to an oxidation catalyst (OxCat);
removing a carbon monoxide, hydrocarbon, or other organic compound content of said TEG output exhaust stream in said OxCat; and
charging a battery in electrical communication with said TEG.

18. The method of claim 17 further comprising cooling said TEG output exhaust stream.

19. The method of claim 17, wherein said cooling comprises at least one of: (a) injecting a cooling air in said TEG output exhaust stream, (b) injecting a cooling fluid in said TEG output exhaust stream, (c) passing said TEG output exhaust stream through a heat exchanger, or (d) passing said TEG output exhaust over a cooling coil.

20. The method of claim 17, further comprising cooling said TEG output exhaust stream to about 300-550° F.

21. The method of claim 17, further comprising cooling said TEG output exhaust stream to about 400-500° F.

22. The method of claim 17, further comprising increasing said oxygen content of said TEG output exhaust stream to about 0.25-1.0%.

23. The method of claim 17, further comprising increasing said oxygen content of said TEG output exhaust stream from a first oxygen content of less than or equal to 0.10% to a second oxygen content of greater than or equal to 0.25%.

24. The method of claim 17, further comprising:
bypassing a bypass portion of said TWC output exhaust stream around said TEG;
joining said bypass portion and said TEG output exhaust stream prior to removing said carbon monoxide content of said TEG output exhaust stream in said OxCat; and
controlling a mixing of said bypass portion and TEG output exhaust stream to adjust a temperature of a mixed exhaust stream.

* * * * *